Oct. 24, 1933.  H. R. ADAMS ET AL  1,932,006
DRESSER SET COMPONENT
Filed Feb. 25, 1933
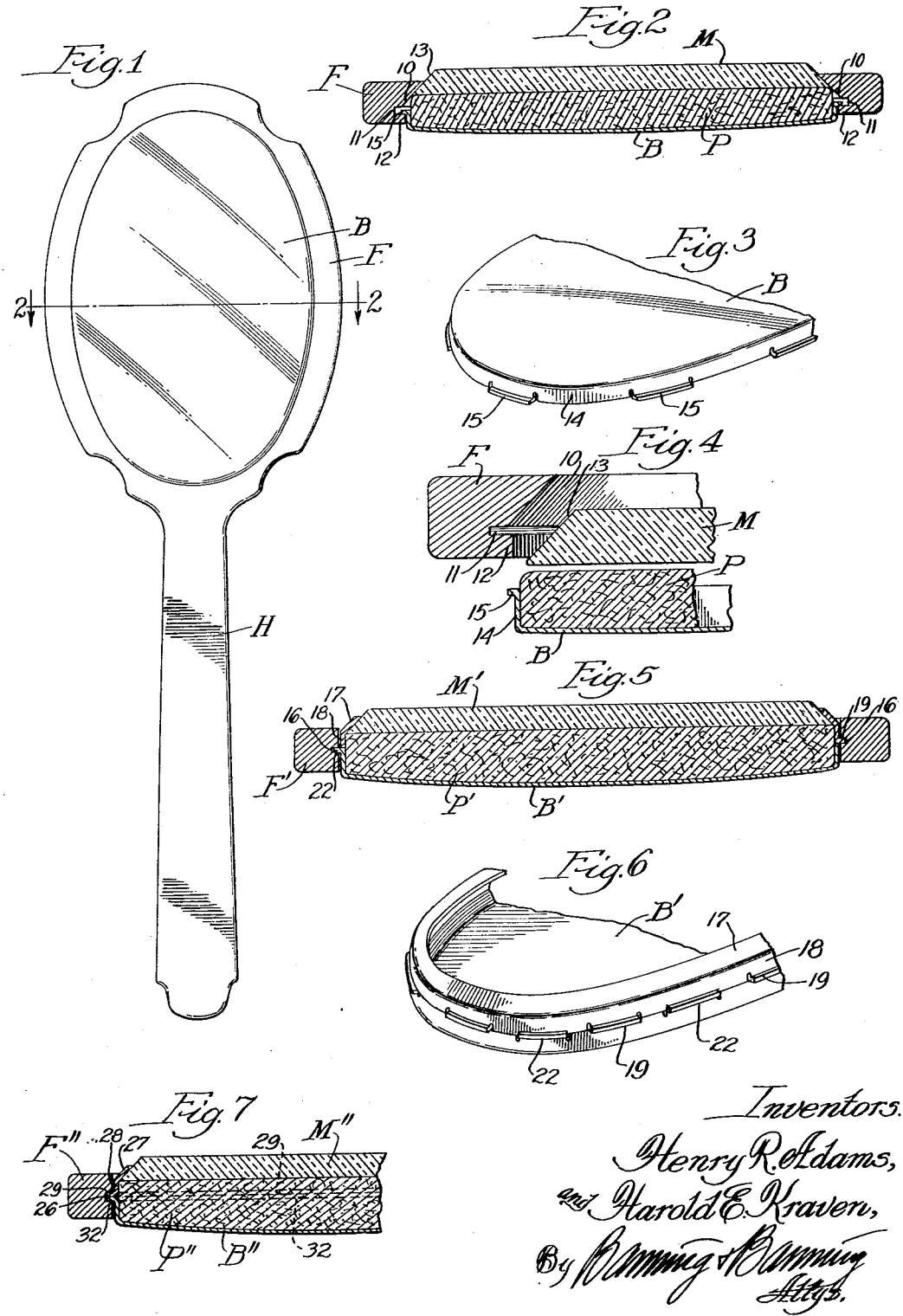
Inventors:
Henry R. Adams,
and Harold E. Kraven,
By Banning & Banning
Attys.

Patented Oct. 24, 1933

1,932,006

UNITED STATES PATENT OFFICE 1,932,006

DRESSER SET COMPONENT

Henry R. Adams and Harold E. Kraven, Elgin, Ill., assignors to Illinois Watch Case Company, Elgin, Ill., a corporation of Illinois Application February 25, 1933. Serial No. 658,626

7 Claims. (Cl. 45—18)

This invention which relates to dresser sets generally is concerned with the construction of a single component thereof, such as a mirror or brush. The present improvements are applicable to any such dresser set article having a frame in the opening of which is mounted a front member, such as a mirror or brush back, together with a back plate having a snap connection with the frame and forming a closure for the rear side of the opening therein. The construction herein described and claimed is advantageous in that it is simple, inexpensive and durable.

A suggestive embodiment of our invention is illustrated in the accompanying drawing in the manner following:

Figure 1 is a rear view of the mirror frame;

Fig. 2 is an enlarged transverse section taken on line 2—2 of Fig. 1;

Fig. 3 is a fragmentary perspective view of the back plate which is applied to the frame;

Fig. 4 is an enlarged fragmentary detail in section of the frame, mirror, packing and back, as these parts appear in the order of assembly;

Fig. 5 is a view similar to Fig. 2 showing a modified construction;

Fig. 6 is a fragmentary perspective view of the bezel and back plate used in the construction of Fig. 5; and Fig. 7 is a view similar to Fig. 2 showing another modified construction.

By way of exemplificaton, we have illustrated a mirror frame F having a handle H, such as is suitable for dresser set use. The frame, which is desirably made of metal, is pierced out to provide a center opening. A bezel 10 is formed upon the inside of the frame opening by a bevel which extends inwardly from the front side of the frame. This beveled face terminates adjacent a slot or groove 11 milled into the frame laterally thereof. In part this slot is defined by a shoulder 12.

Assembled with such a frame is a mirror M having a beveled edge 13 conforming to the bezel. The size and shape of the mirror accord generally with that of the frame opening, the mirror being free to enter therein past the shoulder so as to rest against the bezel. With such a construction the face of the mirror may be protruded slightly beyond the front side of the frame, as shown.

In assembling the several parts of this dresser component, the mirror is placed against the bezel of the frame. A layer of packing P is then arranged behind the mirror. Finally, a back plate B is brought up against the packing and secured to the frame. The back consists of a plate having a size and shape which accord generally with that of the opening in the frame. The edges of the back plate are upturned to form a marginal rim 14 adapted to enter the opening in the frame and fit snugly against the shoulder thereof. Extending outwardly from the edges of the marginal rim are a series of spaced tabs 15. In applying the back plate to the frame, these tabs are sprung back sufficiently to clear the shoulder 12 so that they move into position opposite the slot 11. When released, the tabs will spring into the slot to complete the assembly and lock the packing and mirror securely in place. The back plate additionally forms a closure for the rear side of the frame opening so as to protect the parts therewithin.

In Figs. 5 and 6 we have illustrated a modified construction which incorporates several of the features already described. In those figures the mirror frame F' is pierced centrally, as before, but, in lieu of an integral bezel, the inside of the frame is provided merely with a groove or slot 16, which may, if desired, be disposed centrally between the front and back sides of the frame. Fitted into this groove is a bezel 17 in the general form of a ring having a marginal rim 18 from which outstand a series of spaced tabs 19, similar to the tabs 15 shown in Fig. 3.

Such a bezel furnishes a mounting for a beveled mirror M' which may be introduced into position from the back side of the frame. When so placed, a layer of packing P' is then brought to position against the mirror back. To complete the assembly, and sustain these parts in assembled relation, I utilize a back plate B' which is similar in all respects to the back plate shown in the remaining figures. The tabs 22 of the back plate are sprung back to facilitate fitting of the back plate into position within the frame, and the disposition of these tabs is such as to alternate with the tabs 19 on the bezel, as suggested in Fig. 6. By this arrangement the two sets of tabs, one struck from the bezel, and the other from the back plate, are staggered so as to lie in a common plane within the slot of the frame.

In Fig. 7 is illustrated a further modified construction wherein the mirror frame F'' is pierced centrally in the same manner as is shown in Fig. 5, the inside of the frame being provided with a groove or slot 26, which may be disposed centrally between the front and back sides of the frame. A bezel 27, similar to the bezel 17, which provides a mounting for the mirror M'', may be fitted in the opening in the frame. The bezel is provided with a marginal rim 28 having a peripheral flange 29 extending outwardly from the edge thereof adapted to lie within the groove 26. The back B'' is similarly provided with a peripheral flange 32 adapted to lie within the groove adjacent the flange 29. The bezel and back are each sprung sufficiently to clear the edge of the frame so that the flanges may be moved into position opposite the groove for entry therein, upon release, to complete the assembly and secure the packing P'' and mirror M'' in place.

The dresser set component herein described may be produced at small expense, and once the parts are assembled into place they are held securely with complete protection afforded by the back plate which serves both as a retainer and closure. It is apparent that the invention may be embodied in forms other than the suggestive showings herein disclosed, and in respect of any such changes or modifications we desire to be protected within the scope of the claims following.

We claim:

1. A dresser set component comprising a frame having a pierced opening formed to provide a bezel adjacent the front side of the frame, there being adjacent the bezel a groove extending around the opening and laterally thereof together with a shoulder adjacent the groove toward the back side of the frame, a member having a beveled edge adapted to be accommodated within the frame opening and confined therein with its beveled edge rested against the bezel, a packing arrranged to the rear of the member and occupying substantially the remaining space within the frame opening, a back plate positioned behind the packing having a marginal rim fitting closely within the frame opening to provide a closure therefor, and outturned spring tabs on the marginal rim of the back plate adapted to enter the groove within the frame opening to lock the back plate in position whereby the packing and member are also secured in place.

2. A dresser set component comprising a frame having a pierced opening formed with a bezel adjacent the front side of the frame, there being a groove extended laterally of the frame adjacent the bezel, a member having a beveled edge receivable within the frame opening and confined therein with its beveled edge rested against the bezel, a packing arranged to the rear of the member, and a back plate having integral spring means receivable within the groove of the frame opening, the back plate extending across the opening to provide a closure therefor and serving, when the spring means are rested within the groove, to secure the member and packing within the frame.

3. A dresser set component comprising a frame having a pierced opening with a groove formed on the inner side thereof, a member receivable within the opening, a bezel confining the member adjacent the front side of the frame, the bezel having means extended into the groove for anchorage therein, a back plate forming a closure for the rear side of the opening and a support for the member, and spring means extended from the back plate into the groove of the frame for anchorage therewithin.

4. A dresser set component comprising a frame having a pierced opening with a groove formed on the inner side thereof, a member receivable within the opening, a bezel confining the member adjacent the front side of the frame, a back plate forming a closure for the rear side of the opening and a support for the member, the bezel and back plate each being provided with spaced peripheral tabs extended into the groove for anchorage therein, the tabs on the bezel lying in the spaces between the tabs on the back plate whereby all the tabs lie in a single plane.

5. A dresser set component comprising a frame having a pierced opening with a groove formed on the inner side thereof, a member receivable within the opening, a bezel confining the member adjacent the front side of the frame, the bezel having means extended into the groove for anchorage therein, a back plate forming a closure for the rear side of the opening and a support for the member, and flange means extended from the back plate into the groove of the frame adjacent the anchorage means on the bezel.

6. A device of the class described, comprising a continuous rigid frame member of substantial thickness defining an intermediate through opening of desired dimensions, the walls defining the opening through said frame being grooved intermediate the faces of the frame, and means for detachably securing a dresser set member in the opening of said frame, comprising a bezel extending from one side edge of said groove towards the front face of said frame and a back carrying portion extending from the other side edge of said groove towards the back face of said frame, at least one of said means having resilient flange means interlocking with the groove in said frame.

7. A dresser set component comprising a continuous rigid outer frame member of substantial thickness defining an intermediate through opening of desired dimensions, the inner wall of said frame being grooved intermediate the faces of the frame, a member shaped to fill the opening in said frame, and a pair of superposed inner frame elements embracing said member, each of said elements being flanged at their meeting edges and said flanges interlocking with the groove in said frame.

HENRY R. ADAMS.
HAROLD E. KRAVEN.